United States Patent
Lei et al.

(10) Patent No.: US 11,303,416 B2
(45) Date of Patent: Apr. 12, 2022

(54) HARQ PROCESS AGGREGATION OF MULTIPLE SCHEDULED SLOTS

(71) Applicant: Lenovo (Beijing) Limited, Beijing (CN)

(72) Inventors: Haipeng Lei, Beijing (CN); Xiaodong Yu, Beijing (CN); Zhi Yan, Beijing (CN); Lianhai Wu, Beijing (CN); Robert Tristan Love, Barrington, IL (US); Ravi Kuchibhotla, Clarendon Hills, IL (US)

(73) Assignee: Lenovo (Beijing) Limited, Beijing (CN)

(*) Notice: Subject to any disclaimer, the term of this patent is extended or adjusted under 35 U.S.C. 154(b) by 0 days.

(21) Appl. No.: 16/640,016

(22) PCT Filed: Aug. 18, 2017

(86) PCT No.: PCT/CN2017/098013
§ 371 (c)(1),
(2) Date: Feb. 18, 2020

(87) PCT Pub. No.: WO2019/033389
PCT Pub. Date: Feb. 21, 2019

(65) Prior Publication Data
US 2020/0235891 A1    Jul. 23, 2020

(51) Int. Cl.
*H04L 5/00* (2006.01)
*H04L 1/18* (2006.01)
*H04W 72/12* (2009.01)

(52) U.S. Cl.
CPC .......... *H04L 5/0055* (2013.01); *H04L 1/1854* (2013.01); *H04L 1/1864* (2013.01); *H04L 5/001* (2013.01); *H04W 72/1289* (2013.01)

(58) Field of Classification Search
CPC ... H04L 5/0055; H04L 1/1854; H04L 1/1864; H04L 5/001; H04L 1/1887; H04L 1/1822;
(Continued)

(56) References Cited

U.S. PATENT DOCUMENTS 10,254,413 B2 *  4/2019  Jin ........................ H04W 84/18
10,595,283 B2 *  3/2020  Kim .................... H04W 52/322
(Continued)

FOREIGN PATENT DOCUMENTS

CN   104521307 A   4/2015
CN   106385709 A   2/2017
WO   2017052345 A1  3/2017

OTHER PUBLICATIONS

International Application No. PCT/CN2017/0998013, "Notification of Transmittal of the International Search Report and the Written Opinion of the International Searching Authority, or the Declaration" dated May 2, 2018, pp. 1-8.
(Continued)

*Primary Examiner* — Hardikkumar D Patel
(74) *Attorney, Agent, or Firm* — Kunzler Bean & Adamson

(57) ABSTRACT

Apparatuses, methods, and systems are disclosed for efficient cross-carrier scheduling of multiple slots. One apparatus includes a receiver that receives, from a base unit, a first control signal that indicates a maximum number of hybrid automatic repeat request ("HARQ") processes. The receiver also receives a second control signal on a first carrier from the base unit that schedules a first number of slots on a second carrier. The apparatus includes a processor that aggregates every two or more of the scheduled first number of slots into a single HARQ process in response to the first number being larger than the maximum number of HARQ processes.

20 Claims, 10 Drawing Sheets

(58) Field of Classification Search
CPC ............. H04L 29/08306; H04L 5/0032; H04L 5/0051; H04W 72/1289; H04W 72/1268; H04W 24/08; H04W 72/0406; H04W 84/18; H04W 84/12; H04W 92/02; H04W 52/322; H04W 52/283; H04W 52/325; H04W 72/048; H04W 72/085; H04W 16/28; H04W 72/04; G01S 19/42; G01S 5/0054; G01S 5/0063; G01S 5/0268; G01S 5/0273; G01V 3/08; H04B 7/0695; H04B 7/10; H04B 7/0408
See application file for complete search history.

(56) References Cited

U.S. PATENT DOCUMENTS

| | | | |
|---|---|---|---|
| 10,798,662 B2* | 10/2020 | Wang | H04W 72/1284 |
| 2020/0045684 A1* | 2/2020 | Futaki | H04B 7/0408 |

OTHER PUBLICATIONS

Samsung, "Cross-Carrier Scheduling and HARQ-ACK Feedback", 3GPP TSG RAN WG1 NR ad-Hoc#2 R1-1710739, Jun. 27-30, 2017, pp. 1-4.

Nokia et al., "On cross-carrier scheduling and joint UCI design", 3GPP TSG RAN WG1 NR#2 R1-1710885, Jun. 27-30, 2017, pp. 1-6.

3GPP, "3rd Generation Partnership Project; Technical Specification Group Radio Access Network; NR; Physical channels and modulation (Release 15)", 3GPP TS 38.211 V0.1.0 3, Aug. 2017, pp. 1-34.

Intel Corporation, "Scheduling and UCI feedback for carrier aggregation", 3GPP TSG-RAN WG1 NR Ad-Hoc #2 R1-1710578, Jun. 27-30, 2017, pp. 1-5.

LG Electronics, "Support of cross-CC DCI/UCI transmission for NR CA", 3GPP TSG RAN WG1 NR Ad-Hoc#2 R1-1710339, Jun. 27-30, 2017, pp. 1-7.

Ericsson, "On scheduled DL HARQ feedback transmission in UL", TSG-RAN WG1 #86bis R1-1609624, Oct. 10-14, 2016, pp. 1-3.

Intel Corporation, "HARQ-ACK multiplexing and bundling", 3GPP TSG RAN WG1 NR Ad-Hoc#2 R1-1710572, Jun. 27-30, 2017, pp. 1-5.

* cited by examiner

FIG. 9

Scheduling pattern table 850

| Pattern Number P | Scheduled Carrier Starting Slot Index SSI | Number of Contiguous Scheduled Carrier Slots N |
|---|---|---|
| 1 | 0 | 2 |
| 2 | 2 | 2 |
| 3 | 4 | 2 |
| 4 | 6 | 2 |
| 5 | 0 | 4 |
| 6 | 4 | 4 |
| 7 | 0 | 8 |

First extended scheduling pattern table 900

| Pattern Number P | Scheduled Carrier Starting Slot Index SSI | Number of Contiguous Scheduled Carrier Slots N |
|---|---|---|
| 1 | 0 | 2 |
| 2 | 2 | 2 |
| 3 | 4 | 2 |
| 4 | 6 | 2 |
| 5 | 0 | 4 |
| 6 | 4 | 4 |
| 7 | 0 | 8 |
| 8 | 8 | 8 |

Second extended scheduling pattern table 920

| Pattern Number P | Scheduled Carrier Starting Slot Index SSI | Number of Contiguous Scheduled Carrier Slots N |
|---|---|---|
| 1 | 0 | 2 |
| 2 | 2 | 2 |
| 3 | 4 | 2 |
| 4 | 6 | 2 |
| 5 | 0 | 4 |
| 6 | 4 | 4 |
| 7 | 0 | 8 |
| 8 | 0 | 16 |

HARQ PROCESS AGGREGATION OF MULTIPLE SCHEDULED SLOTS

FIELD

The subject matter disclosed herein relates generally to wireless communications and more particularly relates to apparatuses, methods, and systems for cross-carrier scheduling for CA with different numerologies on different carriers.

BACKGROUND

The following abbreviations are herewith defined, at least some of which are referred to within the following description.

Third Generation Partnership Project ("3GPP"), Positive-Acknowledgment ("ACK"), Access and Mobility Management Function ("AMF"), Binary Phase Shift Keying ("BPSK"), Carrier Aggregation ("CA"), Component Carrier ("CC"), Carrier Indicator Field ("CIF"), Clear Channel Assessment ("CCA"), Control Channel Element ("CCE"), Cyclic Prefix ("CP"), Channel State Information ("CSI"), Common Search Space ("CSS"), Discrete Fourier Transform Spread ("DFTS"), Downlink Assignment Index ("DAI"), Downlink Control Information ("DCI"), Downlink ("DL"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Multiple Input Multiple Output ("MIMO"), Multi User Shared Access ("MUSA"), Narrowband ("NB"), Negative-Acknowledgment ("NACK") or ("NAK"), New Data Indicator ("NDI"), Network Function ("NF"), Next Generation Node B ("gNB"), Non-Orthogonal Multiple Access ("NOMA"), New Radio ("NR"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Redundancy Version ("RV"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Session Management Function ("SMF"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), Subcarrier Spacing ("SCS"), Transport Block ("TB"), Transport Block Size ("TBS"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Entity/Equipment (Mobile Terminal) ("UE"), Uplink ("UL"), User Plane Function ("UPF"), Universal Mobile Telecommunications System ("UMTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In 5G networks, downlink transport blocks are carried on the Physical Downlink Shared Channel (PDSCH). HARQ-ACK feedback bits corresponding to the PDSCH are transmitted either on the Physical Uplink Control Channel (PUCCH) or on the Physical Uplink Shared Channel (PUSCH). Additionally, 5G networks support multiple transmission numerologies, such as 15, 30, and 60 kHz subcarrier spacing values for below 6 GHz and 60, 120 kHz subcarrier spacing values for above 6 GHz. To enable carrier aggregation scenarios across carrier frequencies below 6 GHz, across carrier frequencies above 6 GHz, and across low-high band, carrier combinations between 15, 30, 60, and 120 kHz need to be supported. In total, numerologies of 15, 30, 60, 120, 240, and 480 kHz are supported.

However, in 5G networks, when cross-carrier scheduling of carriers with different numerologies occurs, DCI overhead may increase substantially.

BRIEF SUMMARY

Methods for. Apparatuses and systems also perform the functions of the methods. The methods may also be embodied in one or more computer program products comprising executable code.

In one embodiment, a method for efficient cross-carrier scheduling of multiple slots includes receiving, from a base station, a first control signal that indicates a maximum number of hybrid automatic repeat request ("HARQ") processes. The method also includes receiving, from the base station, a second control signal on a first carrier that schedules a first number of slots on a second carrier and aggregating every two or more of the scheduled first number of slots to a single HARQ process in response to the first number being larger than the maximum number of HARQ processes.

Another method for efficient cross-carrier scheduling of multiple slots includes transmitting, to the remote unit, a first control signal that indicates a maximum number of HARQ processes. The method also includes transmitting, to the remote unit, a second control signal on a first carrier that schedules a first number of slots on a second carrier and aggregating every two or more of the scheduled first number of slots to a single HARQ process in response to the first number being larger than the maximum number of HARQ processes.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 9 illustrates tables depicting the embodiment of an efficient slot scheduling pattern of FIG. 8 and two additional embodiments of efficient slot scheduling patterns for cross-carrier scheduling of multiple slots for component carrier having different numerologies.

DETAILED DESCRIPTION

Figure 1:
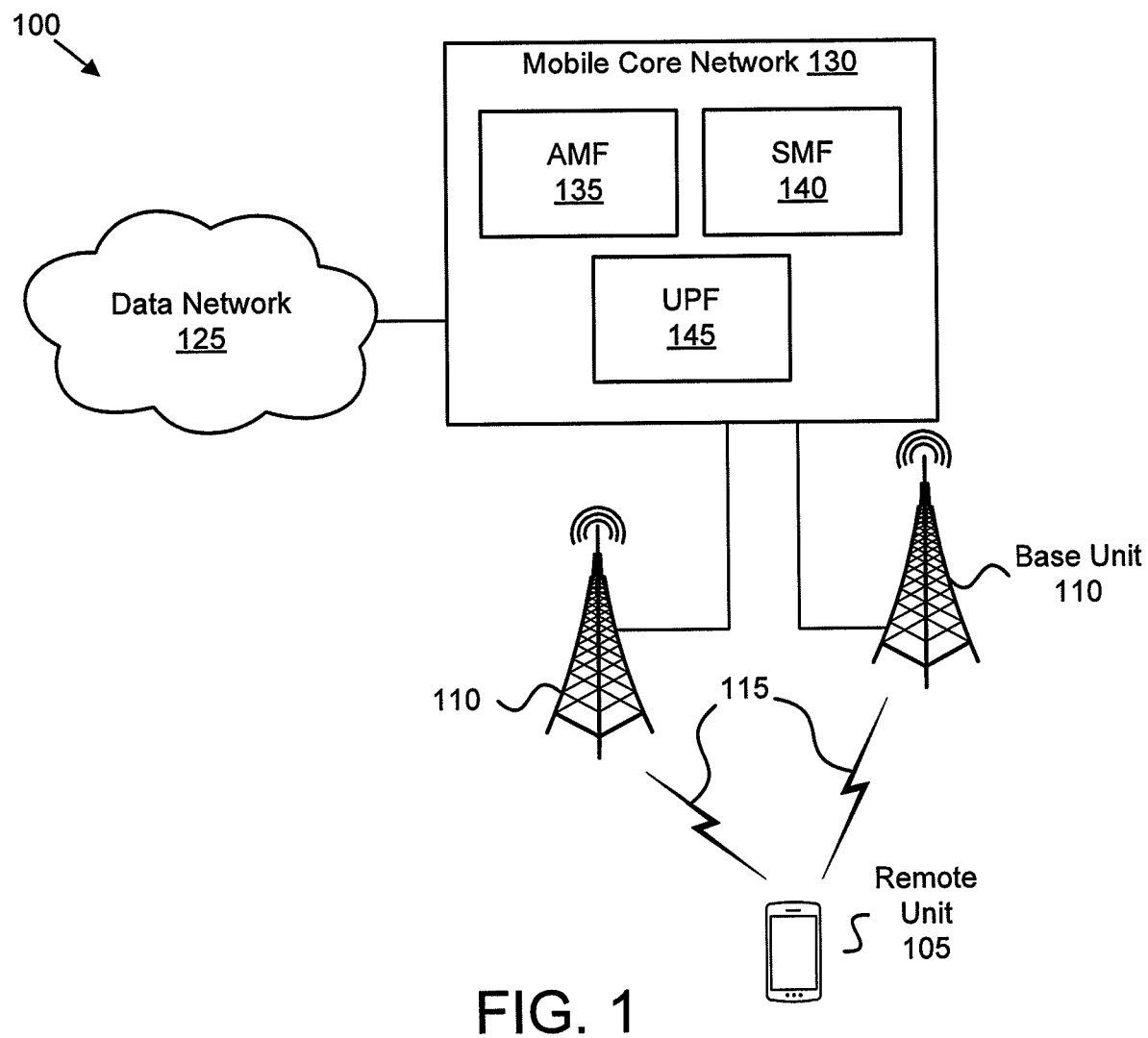
FIG. 1 is a schematic block diagram illustrating one embodiment of a wireless communication system for carrier aggregation with cross-carrier scheduling on different component carriers with different numerologies.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

FIG. 1 is a schematic block diagram illustrating one embodiment of a wireless communication system 100 for cross-carrier scheduling for CA with different numerologies on different carriers, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE-A or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like.

Moreover, the remote units 105 may be referred to as subscriber units, mobiles, mobile stations, users, terminals, mobile terminals, fixed terminals, subscriber stations, user equipment ("UE"), user terminals, a device, or by other terminology used in the art. The remote units 105 may communicate directly with one or more of the base units 110 via uplink ("UL") and downlink ("DL") communication signals, for example a remote unit 105 may send data in a transmission block ("TB") to a base unit 110 via UL communication signals and receive data or control signals from the base unit via DL communication signals. Furthermore, the UL and DL communication signals may be carried over the communication links 115.

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN") that may include one or more controllers communicably coupled to one or more corresponding base units 110. The RAN is generally communicably coupled to one or more core networks, which in turn may be coupled to other networks, like the Internet and public switched telephone networks, among other networks. These and other elements of radio access and core networks are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or the evolved packet core ("EPC"), which may be coupled to other data network 125, like the Internet and private data networks, among other data networks. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes an access and mobility management function ("AMF") 135, a session management function ("SMF") 140, and a user plane function ("UPF") 145. Although a specific number of AMFs 135, SMFs 140, and UPFs 145 are depicted in FIG. 1, one of skill in the art will recognize that any number of AMFs 135, SMFs 140, and UPFs 145 may be included in the mobile core network 130.

The AMF 135 provides services such as UE registration, UE connection management, and UE mobility management. The SMF 140 manages the data sessions of the remote units 105, such as a PDU session. The UPF 145 provides user plane (e.g., data) services to the remote units 105. A data connection between the remote unit 105 and a data network 125 is managed by a UPF 145.

As discussed in further detail below, a base unit 110 may transmit, to a remote unit 105, downlink transmissions over multiple carriers or serving cells, referred as "carrier aggregation." Here, the remote unit 105 is configured with a set of two or more component carriers ("CCs"). Each component carrier includes a plurality of subcarriers and has a subcarrier spacing value (also referred to as "numerology"). In certain embodiments, a first component carrier has a smaller subcarrier spacing value than a second component carrier. Here, multiple slots in the second component carrier correspond to one slot in the first component carrier.

In certain embodiments, the base unit 110 uses the first carrier to schedule resources (e.g., slots) in the second carrier, referred to as "cross-carrier scheduling." In some embodiments, the base unit 110 uses one slot in the first carrier to schedule multiple slots in the second carrier. In one embodiment, the first carrier and second carrier are the same carrier, where the first carrier is a first portion of the carrier (e.g., carrying PDCCH) having a first numerology and the second carrier is a second portion of the same carrier (e.g., carrying PDSCH or PUSCH) having a second numerology greater than the first. In another embodiment, the first carrier and second carrier are different carriers in the same frequency band. In a third embodiment, the first carrier and second carrier are the different carriers located in different frequency bands (e.g., one being in a low-frequency band with carrier frequencies below 6 GHz and the other in a high-frequency band with carrier frequencies above 24 GHz).

Generally, a TB is transmitted in each slot of the second carrier and each TB is associated with one HARQ Process. The DCI is to include signaling overhead for the HARQ process including a HARQ process ID, a new data indicator ("NDI"), and a redundancy version ("RV"). With four bits allocated to the HARQ process ID, one bit for the NDI, and two bits for the RV, the DCI will require seven specific bits for each HARQ process. As the number of slots scheduled in the second carrier increase, the DCI payload likewise increases in size. As will be appreciated by one of skill in art, large numbers of scheduled slots in the second carrier may result in a DCI payload size that is too large (e.g., to transmit in one slot of the first carrier).

For more efficient multi-slot scheduling, the base unit 110 configures the remote unit 105 with a maximum number of HARQ processes (e.g., per DCI). The maximum number of HARQ processes may be selected to limit the DCI to a manageable payload size. In certain embodiments, the maximum number of HARQ processes may be fixed by specification; however, in many described embodiments, the base unit 110 configures the remote unit 105 with the maximum number of HARQ processes via RRC signaling.

Further, the base unit 110 schedules the remote unit 105 with the first number of slots (e.g., contiguous slots) on the second carrier. Where the scheduled number of slots is greater than the maximum number of HARQ processes, two or more of the contiguous slots are bundled together into a single HARQ process. Here, transmissions on the bundled slots share the same HARQ process information (e.g., HARQ process ID). By bundling multiple slots into a single HARQ process, signaling overhead is reduced and a greater number of slots can be scheduled on the second carrier.

In one embodiment, a TB is transmitted on each of the bundled slots. The remote unit 105 generates a HARQ-ACK bit for the TB(s) transmitted on the bundled slots (e.g., by performing a logical AND operation on HARQ-ACK bits for individual TB(s) and provides the base unit 110 with HARQ-ACK feedback. In another embodiment, a single (e.g., larger) TB may be transmitted over the bundled slots and/or the bundled slots may be merged into a single slot. The remote unit 105 generates a HARQ-ACK bit for the TB transmitted on the bundled slots and provides the base unit 110 with HARQ-ACK feedback.

Moreover, signaling overhead may also be reduced when scheduling contiguous slots on the second carrier by encoding starting slot position/index, a number of contiguous schedule slots in the DCI. In some embodiments, the base unit 110 configures the remote unit 105 with sets of values, including scheduling patterns, indicating starting slots and number of slots scheduled, the RRC signaling. Here, the configured sets may form a lookup table. Then, the base unit 110 transmits in DCI an indication of a particular member of the set (e.g., an index value for the lookup table) and the remote unit 105 identifies the particular member of the previously configured set. Thus, from the previously configured set the remote unit 105 determines the starting slot and number of slots scheduled on the second carrier.

Figure 2:
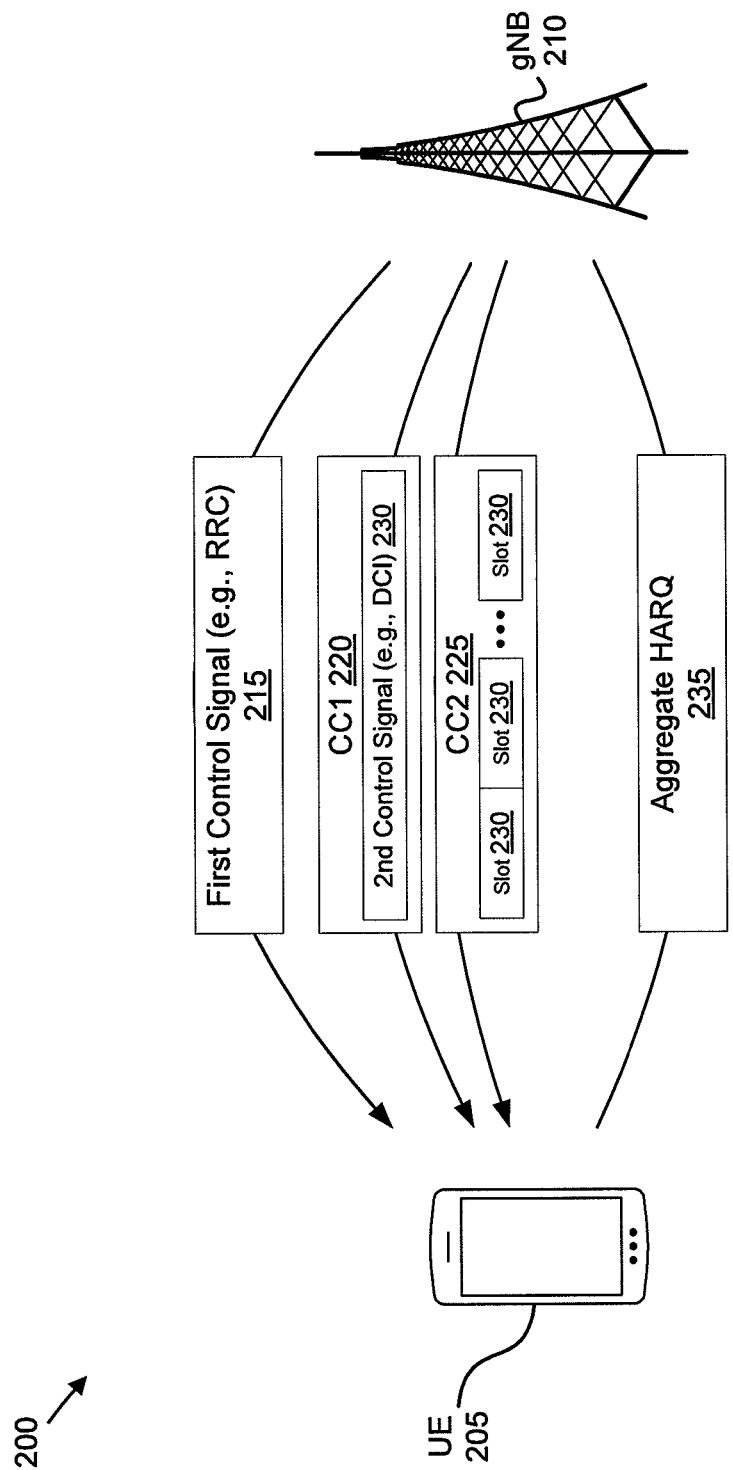
FIG. 2 illustrates one embodiment of a network architecture for carrier aggregation with cross-carrier scheduling on different component carriers having different numerologies.

FIG. 2 depicts one embodiment of a network 200 for cross-carrier scheduling for CA with different numerologies on different carriers, according to embodiments of the disclosure. The network 200 includes a UE 205 and gNB 210. The network 200 depicts a simplified embodiment of the wireless communication system 100. The UE 205 may be one embodiment of the remote unit 105, while the gNB 210 may be one embodiment of the base unit 110. Here, the gNB 210 may be a gNB or 5G base station. Although only one UE 205 is depicted, in other embodiments the gNB 210 may serve a plurality of UEs 205.

As depicted, the gNB 210 aggregates multiple carriers, e.g. a first component carrier ("CC1") 220 and second component carrier ("CC2") 225, for communicating with the UE 205. The gNB 210 transmits a first control signal (e.g., an RRC signal) 215 to the UE 205. Here, the first control signal 215 configures a maximum number of HARQ processes (e.g., per DCI). In various embodiments, the first control signal 215 may include information relating to scheduling multiple contiguous slots on CC2 220, including a starting slot offset, a set of possible numbers of contiguously scheduled slots, a set of possible starting slots, or possible scheduling patterns (where scheduling pattern indicates both a starting slot and a number of contiguously scheduled slots), and the like. Cross-carrier scheduling of multiple slots is discussed in further detail below with reference to FIGS. 5-9. In the depicted embodiment, multiple PDSCHs 230 are scheduled on multiple slots in CC2 220 (e.g., each scheduled slot carrying a PDSCH 230). However, in other embodiments, the scheduled slots may be uplink slots or combination of uplink and downlink slots.

Where the number of schedule slots is greater than the maximum number of HARQ processes, the UE 205 and the gNB 210 aggregate every two or more of the contiguously scheduled slots into a single HARQ process (see block 235. For each HARQ process, transmissions on each of the two or more slots are associated with the same HARQ process information (e.g., HARQ process ID). The UE 205 aggregates the two or more slots into a single HARQ process (e.g., using a logical AND operation) and generates single bit HARQ-ACK feedback for each HARQ process. The UE 205 transmits HARQ-ACK feedback for the aggregated slots in UCI.

Figure 3:
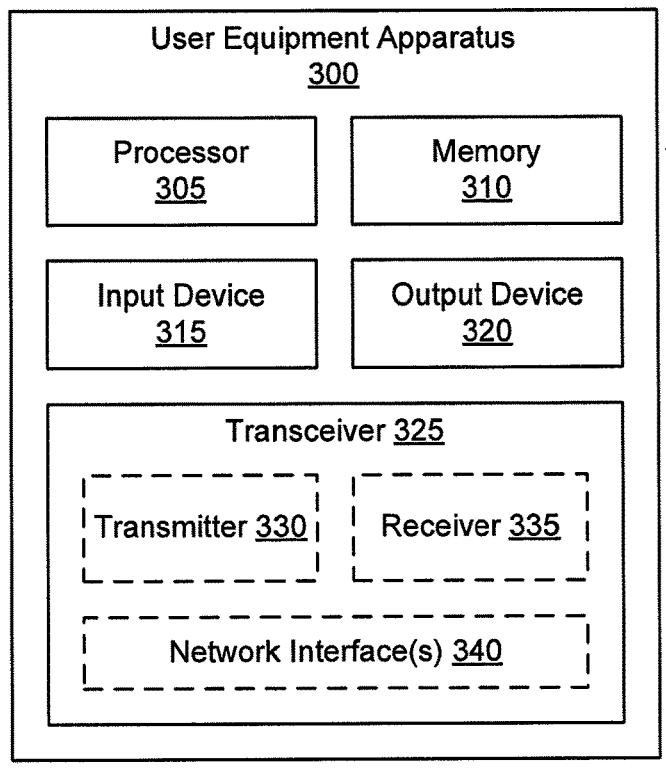
FIG. 3 is a schematic block diagram illustrating one embodiment of a user equipment apparatus for carrier aggregation with cross-carrier scheduling on different component carriers having different numerologies.

FIG. 3 depicts one embodiment of a user equipment apparatus 300 that may be used for efficient cross-carrier scheduling of multiple slots, according to embodiment of the disclosure. The user equipment apparatus 300 may be one embodiment of the remote unit 105 and/or the UE 205, described above. Furthermore, the user equipment apparatus 300 may include a processor 305, a memory 310, an input device 315, an output device 320, a transceiver 325 for communicating with one or more base units 110.

As depicted, the transceiver 325 may include a transmitter 330 and a receiver 335. The transceiver 325 may also support one or more network interfaces 340, such as the Uu interface used to communicate with a gNB. In some embodiments, the input device 315 and the output device 320 are combined into a single device, such as a touchscreen. In certain embodiments, the user equipment apparatus 300 may not include any input device 315 and/or output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In some embodiments, the processor 305 controls the receiver 335 to receive a first control signal from a base station. Here, the first control signal indicates a maximum number of hybrid automatic repeat request ("HARQ") processes, for example a maximum per downlink control information ("DCI"). At a later time, the receiver 335 also receives a second control signal on a first carrier. The second control signal schedules a first number of slots on a second carrier. The scheduled slots may be for downlink data transmission, uplink data transmission, and combinations thereof.

The first carrier and second carrier may each be component carriers used in carrier aggregation. The first carrier and second carrier may be same carrier or different carriers. Moreover, the first carrier and second carrier may have different subcarrier spacing (numerologies) from each other, with the first carrier having a smaller subcarrier spacing. Where the first and second carriers have different subcarrier spacing, multiple slots on the second carrier may fit within the time domain boundaries of one slot of the first carrier.

In response to the scheduled number of slots being larger than the maximum number of HARQ processes, the processor 305 aggregates every two or more of the scheduled first number of slots to a single HARQ process. In certain embodiments, the second control signal includes a parameter indicating a slot aggregation granularity. In such embodiments, the number of slots aggregated into a single HARQ process corresponds to the slot aggregation granularity by the processor 305.

For example, the slot aggregation granularity may indicate that every two slots, four slots, eight slots, etc. are to be aggregated into a single HARQ process. In certain embodiments, the slot aggregation granularity is a power of two. In certain embodiments, the slot aggregation granularity parameter has a value of n, where every $2^n$ slots are bundled (aggregated) into a single HARQ process. The slot aggregation granularity is selected to maintain the number of HARQ processes in DCI to be less than or equal to the maximum number of HARQ processes (e.g., as indicated in the first control signal).

Where the second control signal does not include a slot aggregation granularity parameter, the processor 305 may determine the number of slots to bundle into a single HARQ process based on knowledge of the maximum number of HARQ processes per DCI and the number of slots scheduled by a particular DCI. In such embodiments, the processor 305 recognizes that slot bundling is required when the number of slots scheduled by a particular DCI, N, is greater than the maximum number of HARQ processes per DCI, M. Here, the processor 305 divides the N by M, to identify the number of slots to bundle into a single HARQ process, h. Where N/M is an integer value, then h is equal to N/M, such that every h of the scheduled slots are bundled into a single HARQ process. Where N/M is a non-integer value, then h is equal to the next integer greater than N/M.

As used herein, aggregating multiple slots into a single HARQ process refers to indicating HARQ-ACK feedback for the data of the multiple slots using a single bit in the HARQ-ACK codebook. In certain embodiments, the receiver 335 receives multiple TBs over the multiple slots aggregated into a single HARQ process, for example one TB per slot. Here, HARQ-ACK feedback for each of the multiple TBs are combined together to derive the single HARQ-ACK bit (e.g., using a logical AND operation). Moreover, the multiple TBs share the same HARQ process ID (e.g., belonging to the single HARQ process).

In some embodiments, instead of receiving one TB on each of the multiple slots aggregated into a single HARQ process, the receiver 335 receives a single TB over the multiple slots aggregated into a single HARQ process (e.g., slot aggregation). Here, the single TB may carry more data than a normal TB, may carry additional redundancy information (e.g., CRC bits) as compared to a normal TB, may be transmitted with different modulation and coding scheme, and combinations thereof. In certain embodiments, the multiple slots aggregated into a single HARQ process are merged to form a single slot of larger duration than a normal slot on the second carrier.

In certain embodiments, the second control signal contains a DCI for cross-carrier scheduling of multiple slots on the second carrier (e.g., second component carrier). The DCI may indicate both the aforementioned number of slots scheduled for the user equipment apparatus 300 and a starting slot position of the scheduled slots. In other embodiments, the starting slot position of the scheduled slots is semi-statically configured via RRC signaling. For example, the first control signal may include a parameter indicating the starting slot position of the scheduled slots.

In some embodiments, the first control signal (e.g., an RRC signal) configures the user equipment apparatus 300 with a first set of values from which the DCI dynamically selects. Here, the first set of values corresponds to possible amounts of slots to be scheduled to the user equipment apparatus, with the DCI indicating a particular member of the first set. Such a coding scheme reduces the number of bits required in DCI, as compared to including the actual number of scheduled slots.

For example, the first control signal may configure the set {2, 4, 8, 16} and the second control signal may contain a 2-bit value pointing to a value in the set. Note that in this example, the entries correspond to powers of two. In an alternative implementation, the DCI may provide a 2-bit value x, where the starting slot equals $2^x$. As another example, the first control signal may configure the set {2, 4, 6, 8} and the second control signal may contain a 2-bit value pointing to a value in the set.

In some embodiments, the first control signal (e.g., an RRC signal) configures the user equipment apparatus 300 with a second set of values from which the DCI dynamically selects. Here, the second set of values corresponds to possible offsets between the reception of the second control signal and a starting slot of the scheduled slots, with the DCI indicating a particular member of the second set. Such a coding scheme reduces the number of bits required in DCI, as compared to including the actual starting slot index.

For example, the first control signal may configure the set {0, 2, 4, 8} and the second control signal may contain a 2-bit value pointing to a value in the set. Note that in this example, the entries correspond to powers of two. In an alternative implementation, the DCI may provide a 2-bit value y, where the starting slot equals $2^y$. As another example, the first control signal may configure the set {0, 2, 4, 6} and the second control signal may contain a 2-bit value pointing to a value in the set.

Where the subcarrier spacing of the second carrier is larger than that of the first carrier, then multiple slots of the second carrier may fit within a single slot of the first carrier. In such embodiments, the starting boundary of a slot k*n of the second carrier may align with the starting boundary of the slot n of the first carrier. Moreover, the ending boundary of a slot (k*n+k−1) of the second carrier may align with the ending boundary of the slot n of the first carrier, where k is power of two and k slots of the second carrier fit within the single slot of the first carrier. In certain embodiments, the second control signal is located in a first slot on the first carrier and schedules multiple slots on the second carrier that fall within the boundaries (in the time domain) of the first slot on the first carrier.

In some embodiments, the first control signal (e.g., an RRC signal) configures the user equipment apparatus 300 with a first set of scheduling patterns from which the DCI dynamically selects. Here, the scheduling patterns correspond to possible combinations of starting slot and number of slots to be scheduled to the user equipment apparatus, with the DCI indicating a particular member of the set. Such a joint coding scheme reduces the number of bits required in DCI, as compared to including the starting slot index and number of scheduled slots. For example, the first control signal may configure the set {2, 4, 8, 16} and the second control signal may contain a 2-bit value pointing to a value in the set. As another example, the first control signal may configure the set {2, 4, 6, 8} and the second control signal may contain a 2-bit value pointing to a value in the set. Various scheduling patterns are discussed in greater detail below, with reference to FIGS. 8 and 9.

The processor 305 identifies the scheduled slots and their placement within the second carrier using one or more of the procedures described above. Where the second control signal scheduled uplink data, the processor 305 controls the transmitter 330 to transmit uplink data on the scheduled slots. Where the second control signal schedules downlink data, the processor 305 controls the receiver 335 to receive the downlink data on the scheduled slots and later controls the transmitter 330 to transmit HARQ-ACK feedback to the base station corresponding to the scheduled downlink slots, with feedback for multiple slots aggregated into a single HARQ process as described herein.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data relating to efficient cross-carrier scheduling of multiple slots. For example, the memory 310 may store scheduling assignments, sets of possible starting slots, sets of possible amounts of scheduled slots, scheduling patters, a maximum HARQ process number, HARQ-ACK feedback, and the like. In some embodiments, the memory 310 also stores program code and related data, such as an operating system or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes two or more different devices, such as a keyboard and a touch panel. In certain embodiments, the input device 315 may include a camera for capturing images or otherwise inputting visual data.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with base units 110 of a mobile communication network. The transceiver 325 may include one or more transmitters 330 and one or more receivers 335. As discussed above, the transceiver 325 may support one or more the network interface 340 for communicating with the base unit 110.

Figure 4:
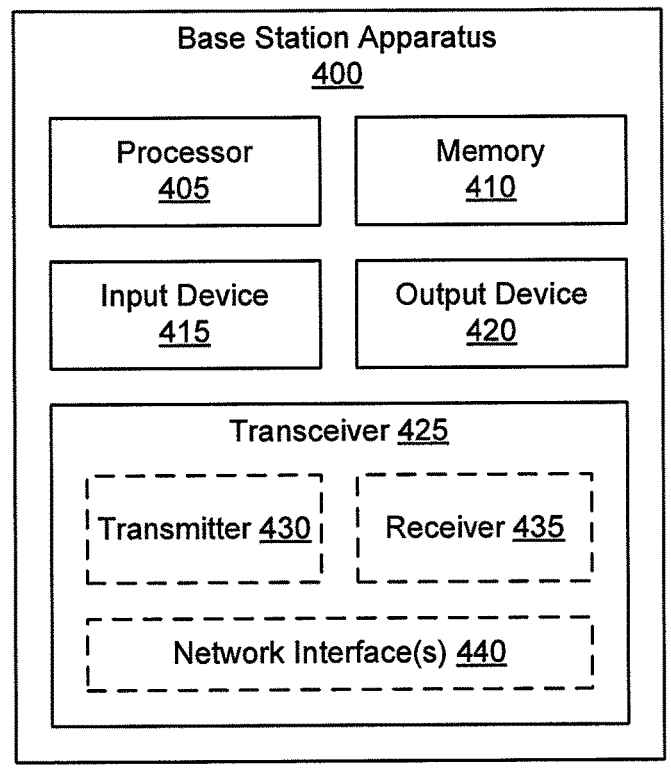
FIG. 4 is a schematic block diagram illustrating one embodiment of a base station apparatus for carrier aggregation with cross-carrier scheduling on different component carriers having different numerologies.

FIG. 4 depicts one embodiment of a base station apparatus 400 that may be used for efficient cross-carrier scheduling of multiple slots, according to embodiments of the disclosure. The base station apparatus 400 may be one embodiment of the base unit 110 and/or gNB 210, described above. Furthermore, the base station apparatus 400 may include a processor 405, a memory 410, an input device 415, an output device 420, a transceiver 425 for communicating with one or more remote units 105 and/or a mobile core network 130.

As depicted, the transceiver 425 may include a transmitter 430 and a receiver 435. The transceiver 425 may also support one or more network interfaces 440, such as the Uu interface, N2 interface, N3 interface, and/or other network interfaces suitable for communication with a remote unit and/or core network. In some embodiments, the input device 415 and the output device 420 are combined into a single device, such as a touchscreen. In certain embodiments, the base station apparatus 400 may not include any input device 415 and/or output device 420.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In some embodiments, the processor 405 controls the transmitter 430 to transmit a first control signal to a remote unit. Here, the first control signal indicates a maximum number of hybrid automatic repeat request ("HARQ") processes, for example a maximum per downlink control information ("DCI"). The number of HARQ processes per DCI may be limited to prevent the DCI payload size for multi-slot scheduling from becoming unmanageably large as the number of slots scheduled in the DCI increases.

At a later time, the transmitter 430 also transmits a second control signal on a first carrier. In certain embodiments, the second control signal includes DCI for cross-carrier scheduling. The second control signal schedules the remote unit with a first number of slots on a second carrier. The scheduled slots may be for downlink data transmission, uplink data transmission, and combinations thereof. The first carrier and second carrier may each be component carriers used in carrier aggregation, where the first carrier has a smaller subcarrier spacing than the second carrier. Accordingly, one slot in the first carrier may correspond to multiple slots in the second carrier.

In response to the scheduled number of slots being larger than the maximum number of HARQ processes, the processor 405 aggregates every two or more of the scheduled first number of slots to a single HARQ process. In certain embodiments, the second control signal includes a parameter indicating, to the remote unit, a slot aggregation granularity. In such embodiments, the number of slots to be aggregated into a single HARQ process corresponds to the slot aggregation granularity.

For example, the slot aggregation granularity may indicate that every two slots, four slots, eight slots, etc. are to be aggregated into a single HARQ process. In certain embodiments, the slot aggregation granularity is a power of two. In certain embodiments, the slot aggregation granularity parameter has a value of n, where every $2^n$ slots are bundled (aggregated) into a single HARQ process. The slot aggregation granularity is selected to maintain the number of HARQ processes in DCI to be less than or equal to the maximum number of HARQ processes (e.g., as indicated in the first control signal).

In some embodiments, the processor 405 may determine the number of slots to bundle into a single HARQ process based on knowledge of the maximum number of HARQ processes per DCI and the number of slots scheduled by a particular DCI. In such embodiments, the processor 405 recognizes that slot bundling is required when the number of slots scheduled by a particular DCI, N, is greater than the maximum number of HARQ processes per DCI, M. Here, the processor 405 divides the N by M, to identify the number of slots to bundle into a single HARQ process, h. Where N/M is an integer value, then h is equal to N/M, such that every h of the scheduled slots are bundled into a single HARQ process. Where N/M is a non-integer value, then h is equal to the next integer greater than N/M.

As used herein, aggregating multiple slots into a single HARQ process refers to the remote unit indicating HARQ-ACK feedback for the data of the multiple slots using a single bit in the HARQ-ACK codebook. In certain embodiments, the transmitter 430 transmits multiple TBs over the multiple slots aggregated into a single HARQ process, for example one TB per slot. Here, the remote unit combines the HARQ-ACK feedback for each of the multiple TBs to derive the single HARQ-ACK bit (e.g., using a logical AND operation). Moreover, the multiple TBs share the same HARQ process ID (e.g., belonging to the single HARQ process), NDI, and RV.

In some embodiments, instead of transmitting one TB on each of the multiple slots aggregated into a single HARQ process, the transmitter 430 transmits a single TB over the multiple slots aggregated into a single HARQ process. Here, the single TB may carry more data than a normal TB, may carry additional redundancy information (e.g., CRC bits) as compared to a normal TB, may be transmitted with different modulation and coding scheme, and combinations thereof. In certain embodiments, the multiple slots aggregated into a single HARQ process are merged to form a single slot of larger duration than a normal slot on the second carrier. Where the second control signal schedules downlink data, the processor 405 controls the receiver 435 to receive HARQ-ACK feedback from the remote unit corresponding to the scheduled downlink slots, with feedback for multiple slots aggregated into a single HARQ process as described herein.

As mentioned above, the second control signal contains a DCI for cross-carrier scheduling of multiple slots on the second carrier (e.g., second component carrier). The DCI may indicate both the aforementioned number of slots scheduled to the remote unit and a starting slot position of the scheduled slots. In other embodiments, the processor 405 controls the transmitter 430 to transmit an RRC signal semi-statically configuring the starting slot position of the scheduled slots. For example, the first control signal may include a parameter indicating the starting slot position of the scheduled slots.

In some embodiments, the first control signal (e.g., an RRC signal) configures the remote unit with a first set of values from which the DCI dynamically selects. Here, the first set of values corresponds to possible amounts of slots to be scheduled to the user equipment apparatus, with the base station apparatus 400 indicating a particular member of the second set via DCI. Such a coding scheme reduces the number of bits required in DCI, as compared to including the actual number of scheduled slots.

For example, the first control signal may configure the set {2, 4, 8, 16} and the second control signal may contain a 2-bit value pointing to a value in the set. Note that in this example, the entries correspond to powers of two. In an alternative implementation, the DCI may provide a 2-bit value x, where the starting slot equals $2^x$. As another example, the first control signal may configure the set {2, 4, 6, 8} and the second control signal may contain a 2-bit value pointing to a value in the set.

In some embodiments, the first control signal (e.g., an RRC signal) configures the remote unit with a second set of values from which the DCI dynamically selects. Here, the second set of values corresponds to possible offsets between the reception of the second control signal and a starting slot of the scheduled slots, with the base station apparatus 400 indicating a particular member of the second set via DCI. Such a coding scheme reduces the number of bits required in DCI, as compared to including the actual starting slot index.

For example, the first control signal may configure the set {0, 2, 4, 8} and the second control signal may contain a 2-bit value pointing to a value in the set. Note that in this example, the entries correspond to powers of two. In an alternative implementation, the DCI may provide a 2-bit value y, where the starting slot equals $2^y$. As another example, the first control signal may configure the set {0, 2, 4, 6} and the second control signal may contain a 2-bit value pointing to a value in the set.

Where the subcarrier spacing of the second carrier is larger than that of the first carrier, then multiple slots of the second carrier may fit within a single slot of the first carrier. In such embodiments, the starting boundary of a slot k*n of the second carrier may align with the starting boundary of the slot n of the first carrier. Moreover, the ending boundary of a slot (k*n+k−1) of the second carrier may align with the ending boundary of the slot n of the first carrier, where k is power of two and k slots of the second carrier fit within the single slot of the first carrier. In certain embodiments, the second control signal is located in a first slot on the first carrier and schedules multiple slots on the second carrier that fall within the boundaries (in the time domain) of the first slot on the first carrier.

In some embodiments, the first control signal (e.g., an RRC signal) configures the remote unit with a first set of scheduling patterns from which the DCI dynamically selects. Here, the scheduling patterns correspond to possible combinations of starting slot and number of slots to be scheduled to the user equipment apparatus, with the DCI indicating a particular member of the set. Such a joint coding scheme reduces the number of bits required in DCI, as compared to including the starting slot index and number of scheduled slots. Examples of scheduling patterns are discussed in further detail below, with reference to FIGS. 8 and 9.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to efficient cross-carrier scheduling of multiple slots. For example, the memory 410 may store scheduling assignments, sets of possible starting slots, sets of possible amounts of scheduled slots, scheduling patters, a maximum HARQ process number, HARQ-ACK feedback, and the like. In some embodiments, the memory 410 also stores program code and related data, such as an operating system or other controller algorithms operating on the base station apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes two or more different devices, such as a keyboard and a touch panel. In certain embodiments, the input device 415 may include a camera for capturing images or otherwise inputting visual data.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with remote unit within a mobile communication network. The transceiver 425 may also communicate with a core network, such as the mobile core network 130. The transceiver 425 may include one or more transmitters 430 and one or more receivers 435. As discussed above, the transceiver 425 may supports one or more the network interface 440 for communicating with remote units 105 and the mobile core network 130.

Figure 5:
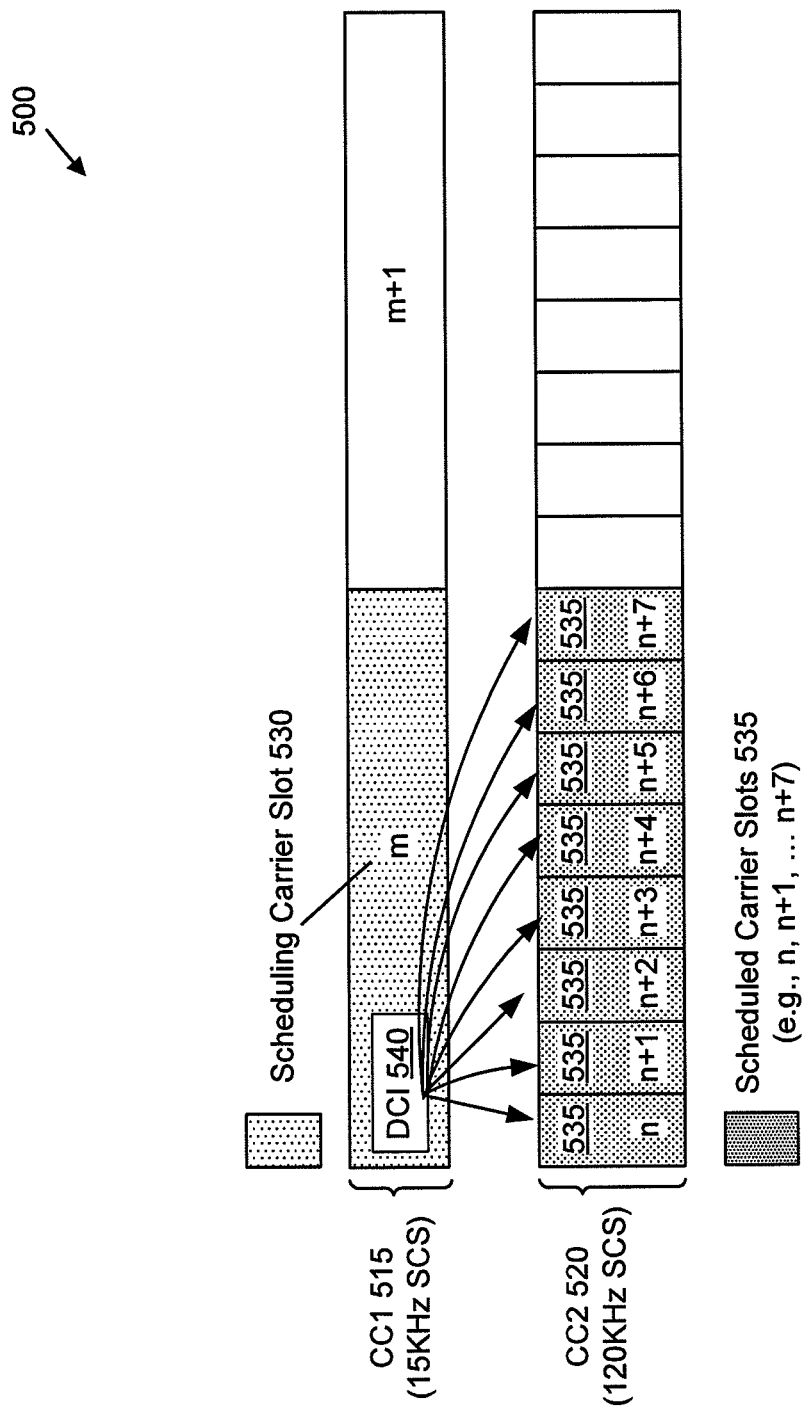
FIG. 5 is a block diagram illustrating one embodiment of carrier aggregation with a first carrier scheduling multiple slots on a second carrier having a different numerology.

FIG. 5 depicts one embodiment 500 of cross-carrier scheduling for CA with different numerologies on different carriers, according to embodiments of the disclosure. Six numerologies (different subcarrier spacings) ranging from 15 kHz to 480 kHz are supported in 5G NR. However, other systems may support more than six numerologies. In some systems, such as 5G NR, cross-carrier scheduling for aggregated carriers with the same or with different numerologies is supported. For example, a base station, such as the gNB 210 discussed above with reference to FIG. 2, may use PDCCH on the low-frequency band (typically with small subcarrier spacing) scheduling a PDSCH transmission on high-frequency band (typically with large subcarrier spacing).

In a simplified example illustrated in FIG. 5, two carriers are configured for carrier aggregation by a UE, such as the UE 205. Here, the configured carriers comprise a first carrier (CC1) 515, e.g., in a low-frequency band, having a subcarrier spacing ("SCS") of 15 kHz and a second carrier (CC2) 520, e.g., in a high-frequency band, having a subcarrier spacing of 120 kHz. Each of the component carriers 515, 520 may correspond to a different serving cell provided by a gNB (such as the gNB 210). As indicated in the legend of FIG. 5, slots for the scheduling carrier CC1 515 having small subcarrier spacing (15 kHz in this example) are depicted with a light fill-pattern while slots for the scheduled carrier CC2 520 having large subcarrier spacing (120 kHz in this example) are depicted with a dark fill-pattern.

In some systems, such as for example 5G NR, low-frequency bands (e.g., below 6 GHz) may be operated with 15, 30, or 60 kHz subcarrier spacing. High-frequency bands (e.g., above 24 GHz may be operated at 60, 120, or 240 kHz subcarrier spacing. In the depicted embodiment, a starting boundary of slot "m" of the first carrier 515 is aligned with the starting boundary of slot "n" of the second carrier 520 and an ending boundary of slot "M" of the first carrier 515 is aligned with the ending boundary of slot "n+7" of the second carrier 520. In other embodiments, the DCI may include timing relationship information regarding the inter-carrier slot boundaries. In the example illustrated in embodiment 500, one slot of 1 ms in the first carrier CC1 515 (having 15 kHz subcarrier spacing) corresponds to eight contiguous slots of 0.125 ms in the second carrier CC2 520 (having 120 kHz subcarrier spacing).

One method to support cross-carrier scheduling is for one slot in the low-frequency band (e.g., the scheduling carrier slot 530) to schedule multiple slots in the high-frequency band (e.g., the scheduled carrier slots 535) as depicted by the arrows from slot m of the low-frequency component carrier CC1 515 to slots n, n+1, n+2, n+7 in embodiment 500, or conversely, for multiple slots in the high-frequency band to schedule one slot in the low-frequency band. In order to support cross-carrier scheduling, the DCI 540 (in the first carrier 515 may contain a scheduled carrier index, i.e., CIF bits, pointing to the second carrier 520. Furthermore, to support multi-slot scheduling, the UE 205 (shown in FIG. 2) should know the maximum number of HARQ processes the DCI 540 can schedule, which determines the DCI 540 payload size for the UE 205 to perform blind detection due to the additional scheduling information such as NDI, RV, etc., which may be slot-specific.

The gNB 210 (also shown in FIG. 2) configures the maximum number of HARQ processes the DCI 540 can schedule via RRC signaling. Additionally, the UE 205 should know the starting slot and the number of slots the current DCI 540 schedules. In one embodiment, the DCI 540 dynamically indicates the starting slot index and the number of slots in the DCI 540.

Using this type of multi-slot scheduling avoids the necessity to transmit eight separate PDCCHs in low-frequency band (e.g., on the first carrier 515) for scheduling each of the eight PDSCHs in high-frequency band (e.g., on the second carrier 520). Note that multi-slot scheduling to book requires additional information (e.g., overhead) in DCI, as compared to single slot scheduling. For example, to deal with eight possible starting slots, 3 bits may be needed in the DCI 540 to indicate a starting slot index on the second carrier CC2 520 (e.g., one of the slots n to n+7) and another 3 bits may be needed to indicate a number of contiguously scheduled slots on the second carrier CC2 520. Thus, in this example, 6 bits are needed in the DCI 540 on CC1 515 for scheduling up to 8 contiguous slots on CC2 520.

In other example embodiments, when the CC1 515 schedules slots on a high-frequency band carrier with 240 kHz or 480 kHz subcarrier spacing, more signaling bits may be needed to indicate the starting slot and duration. For example, if the CC1 515 has 15 kHz subcarrier spacing and the high-frequency band carrier has 480 kHz subcarrier spacing, then indicating which of the 32 scheduled carrier slots is the starting slot may utilize 5 bits. Similarly, indicating how many contiguous scheduled carried slots to schedule (e.g., from 1 to 32 contiguous slots) may utilize an additional 5 bits. Thus, 10 bits of the DCI 540 may be taken up for cross-carrier scheduling just to indicate the starting slot index and the number of contiguous slots scheduled.

In some embodiments, certain patterns may be utilized to enable selection of a reduced number of desirable combinations of starting slots and number of contiguous slots with fewer bits which improves the efficiency and reliability of the system by reducing the size of the DCI 540 payload. For example, two bits may be used to indicate one of four possible starting slots (e.g., n, n+2, n+4, or n+6) and another two bits used to indicate the number of contiguously scheduled slots (e.g., 2, 4, 8, 16, etc.). In this example, the total number of bits is reduced from 6 to 4, thereby reducing the DCI payload size. As another example, three bits may be used indicate one of eight preconfigured scheduling patterns, each scheduled pattern having a starting slot and a number of contiguously scheduled slots. In this example, the total number of bits is reduced from 6 to 3, thereby further reducing the DCI payload size.

Figure 6:
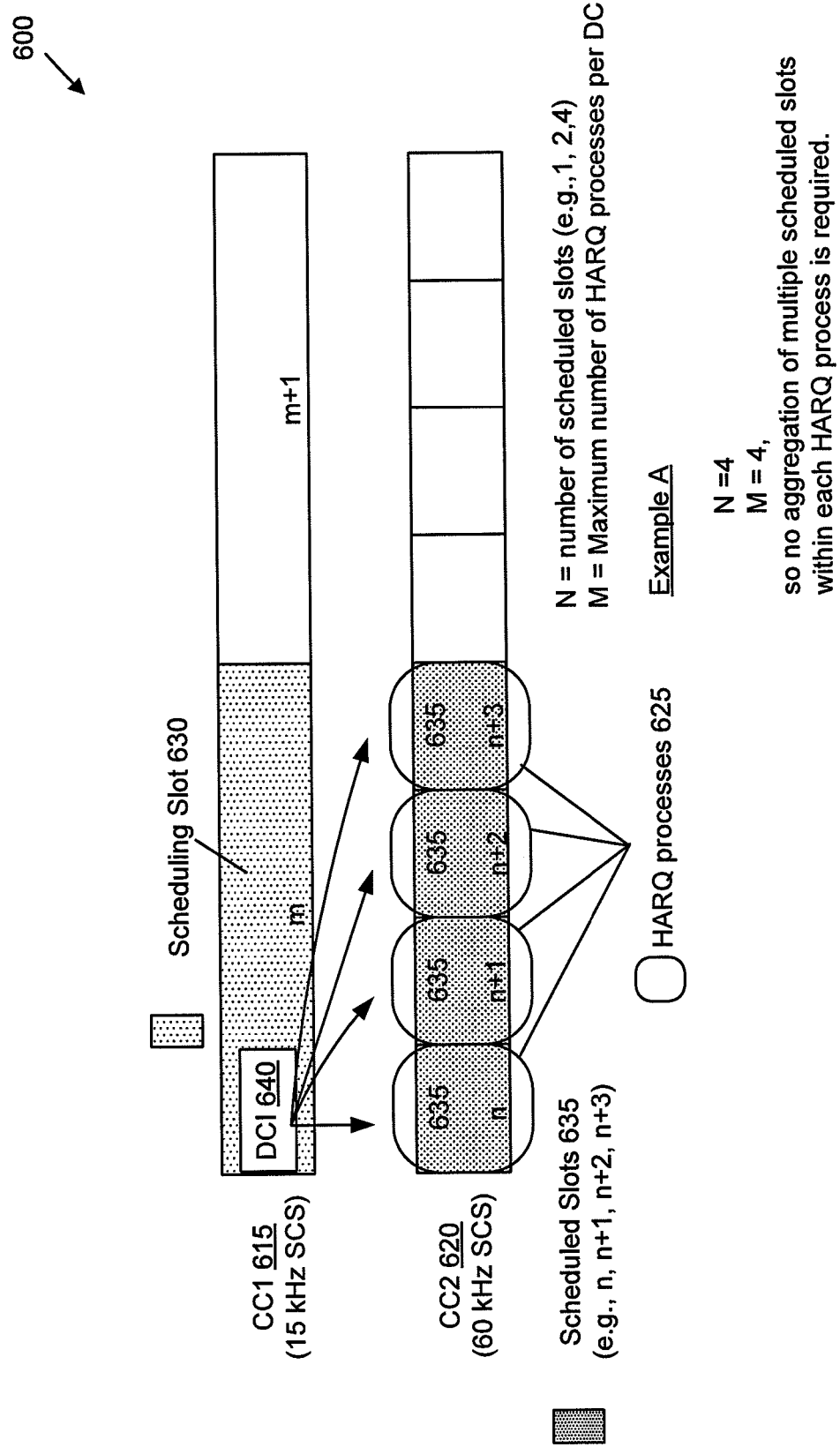
FIG. 6 is a block diagram illustrating one embodiment of carrier aggregation with a first carrier scheduling multiple slots on a second carrier having a different numerology where each of the multiple scheduled slots has one corresponding HARQ process.

FIG. 6 is a block diagram illustrating one embodiment 600 of a system and/or method of cross-carrier scheduling in carrier aggregation with a low-frequency band component carrier CC1 615 scheduling multiple slots 635 on a high-frequency band component carrier CC2 620 having a different numerology. Here, the carrier CC1 615 is the scheduling carrier and the carrier CC2 620 is the scheduled carrier. Note that in the depicted embodiment, each of the multiple scheduled slots 635 has one corresponding HARQ process 625.

In embodiment 600, the number of scheduled slots, N, equals four and the maximum number of HARQ processes allowed for one DCI, M, also equals four. As depicted, the scheduling component carrier CC1 615 has subcarrier spacing of 15 kHz and includes a DCI 640 in the scheduling slot 630 (denoted slot m). The DCI 640 may include bits that indicate the scheduling of four consecutive scheduled slots 635 (denoted slots n, n+1, n+2, n+3) in carrier component 620 which has 60 kHz subcarrier spacing. Note that the starting boundary of slot m aligns with the starting boundary of slot n, and the ending boundary of slot M aligns with the ending boundary of slot n+3.

The ratio of the subcarrier spacing for the higher frequency scheduled carrier CC2 620 (also referred to as "SCS2") to the subcarrier spacing for the lower frequency scheduling carrier 615 (also referred to as "SCS1") is denoted as k, where k is a power of 2. In other words, k=SCS2/SCS1 and may be, for example, 1, 2, 4, 8, 16, 32 in the case of 5G NR. In the depicted example, k equals four (e.g., 60 kHz SCS/15 kHz SCS=4).

For multi-slot scheduling, one DCI 640 transmitted in slot m on CC1 615 schedules contiguous slots within the slot set {k*n, k*n+1, k*n+2, k*n+(k−1)} on CC2 620. In the depicted embodiment, the starting slot on component carrier CC2 620 can be at any of the slots (e.g., n, n+1, n+2, n+3) that align within slot m on the component carrier CC1 615.

Here, the number of contiguous slots scheduled on the component carrier CC2 620 may be a binary factor of k (e.g. 1, 2, or 4) so long as none of the continuously scheduled slots 635 (e.g., n, n+1, n+2, n+3) on the high-frequency component carrier CC2 620 extend beyond the end of slot m of CC1 615.

In multi-slot scheduling, if each scheduled slot 635 has one independent transport block ("TB") with an independent HARQ process 625, then as the number of contiguously scheduled slots increases, more and more signaling overhead is included in each DCI 640. This can be significant because, except for the shared field for each HARQ process 625 (e.g., MCS, frequency resource allocation, TPC, etc.,), each HARQ process 625 is to have its own HARQ process ID, NDI, and RV indication. For example, in at least one embodiment, signaling overhead for each HARQ process 625 includes 4 bits for a HARQ process ID, 1 bit for NDI and 2 bits for RV, making a total of 7 specific bits of signaling overhead per HARQ process 625. Thus, as the number of HARQ processes 625 per DCI 640 increases, the number of overhead bits in the DCI payload increases significantly. Accordingly, the multi-slot scheduling technology may be significantly improved by optimizing the DCI payload size by limiting the maximum number of HARQ processes 625 per DCI 640.

In some embodiments, to optimize the DCI payload size for multi-slot scheduling, the maximum number of HARQ processes 625 scheduled by one DCI 640 is set to M, e.g., configured via RRC signaling. Thus, the maximum number of signaling overhead bits from HARQ processes 625 to the overall DCI 640 payload size is limited to M times the number of signaling overhead bits per HARQ process 625. In the embodiments in which M is set via RRC signaling, carrier aggregation technology for multi-slot scheduling is improved by providing greater flexibility while at the same time optimizing overhead associated with HARQ processes 625. In other embodiments, M can be fixed in specification, which also improves carrier aggregation technology by optimizing the overhead associated with HARQ processes 625.

In some embodiments, for multi-slot scheduling in which N is larger than M, every N/M contiguous scheduled slots 635 on high-frequency carrier component CC2 620 are aggregated (i.e. bundled together) to correspond to one HARQ process 625 for each bundle of contiguous scheduled slots 635. In some embodiments, both M and N are set to powers of 2.

Consider Example A, depicted in FIG. 6, where M, the maximum number of HARQ processes 625 supported in one DCI 640, is set to 4. In Example A, the DCI 640 schedules four contiguous slots n, n+1, n+2, and n+3 to a UE 205, therefore N (the number of scheduled slots 635) is also 4. Because N is not greater than M, no aggregation of scheduled slots 635 is needed and each of the scheduled slots 635 corresponds to one HARQ process 625. In other embodiments, HARQ process aggregation may be required, as discussed below with reference to FIGS. 7 and 8.

Figure 7:
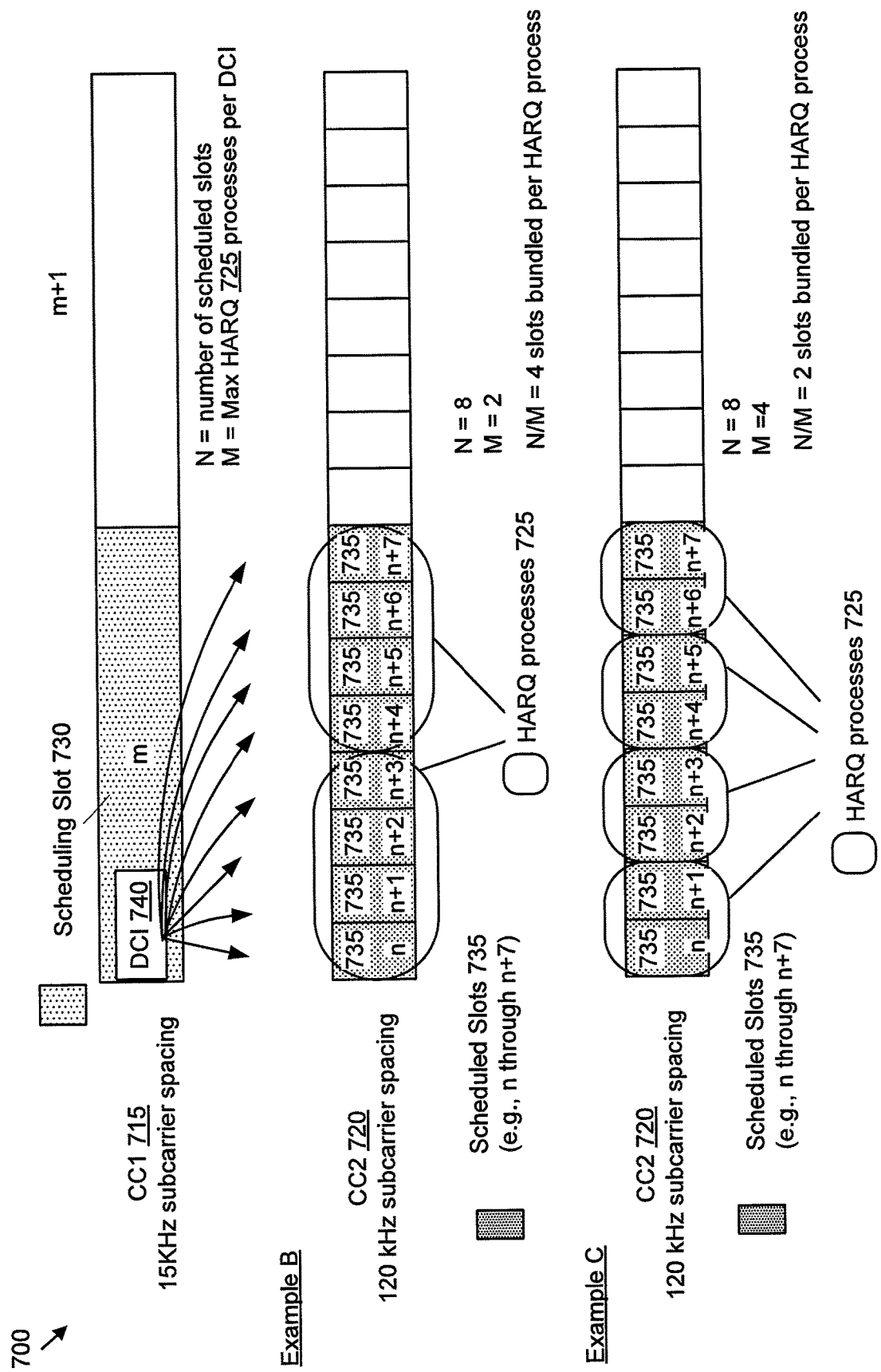
FIG. 7 is a block diagram illustrating one embodiment of carrier aggregation with a first carrier scheduling multiple slots on a second carrier having a different numerology where several of the multiple scheduled slots are aggregated for each HARQ process.

FIG. 7 is a block diagram illustrating one embodiment 700 of multi-slot scheduling in carrier aggregation involving a low-frequency component carrier CC1 715 that schedules multiple slots 735 on a high-frequency component carrier CC2 720 having a different numerology where several of the multiple scheduled slots 735 are aggregated for each HARQ process 725. Here, component carrier CC1 715 is the scheduling carrier and component carrier CC2 720 is the scheduled carrier.

In various embodiments, such as embodiment 700, in which N (the number of scheduled slots 735) is greater than M (the maximum number of HARQ processes 725 per DCI), N/M contiguous slots may be aggregated (i.e., bundled together) into a single HARQ process 725. FIG. 7 depicts two examples, Example B and Example C, showing different values of M. In Example B, four slots on carrier CC2 720 are bundled into a single HARQ-ACK process, while in Example C, two slots on carrier CC2 730 are bundled into a single HARQ-ACK process.

In one embodiment, each scheduling slot 730 carries one TB. Here, HARQ-ACK feedback for the individual TBs are aggregated (e.g., by a logic AND operation) such that one HARQ-ACK bit corresponds to the aggregated/bundled slots. In other words, if an error occurs within any of the four aggregated scheduled slots 735, then the error is indicated with one HARQ-ACK bit so that the TB(s) in the aggregated scheduled slots 735 may be retransmitted. In another embodiment, one TB is transmitted over the aggregated slots (e.g., using slot aggregation).

As shown in Example B of FIG. 7, when the number of scheduled slots (e.g., N=8) is larger than the max number of HARQ processes (e.g., M=2), then every four contiguous scheduled slots 735 are aggregated/bundled to form one HARQ process 725. In other words, transmissions in each of the four slots n, n+1, n+2, n+3 share the same HARQ process ID, NDI, and RV. In one embodiment, each of the four slots n, n+1, n+2, n+3 carries one TB. Alternatively, the four aggregated slots can form a larger slot to carry one large TB. FIG. 7 further depicts Example C in which N=8 and M=4, so N/M=2. Thus, in Example C, two scheduled slots 735 are aggregated/bundled per HARQ process 725. In addition, slot granularity (e.g., the number of slots to bundle into a single HARQ process 725) may be explicitly included in DCI for indicating the number of contiguous slots which are aggregated/bundled as a larger slot, as explained below with respect to FIGS. 8 and 9.

Figure 8:
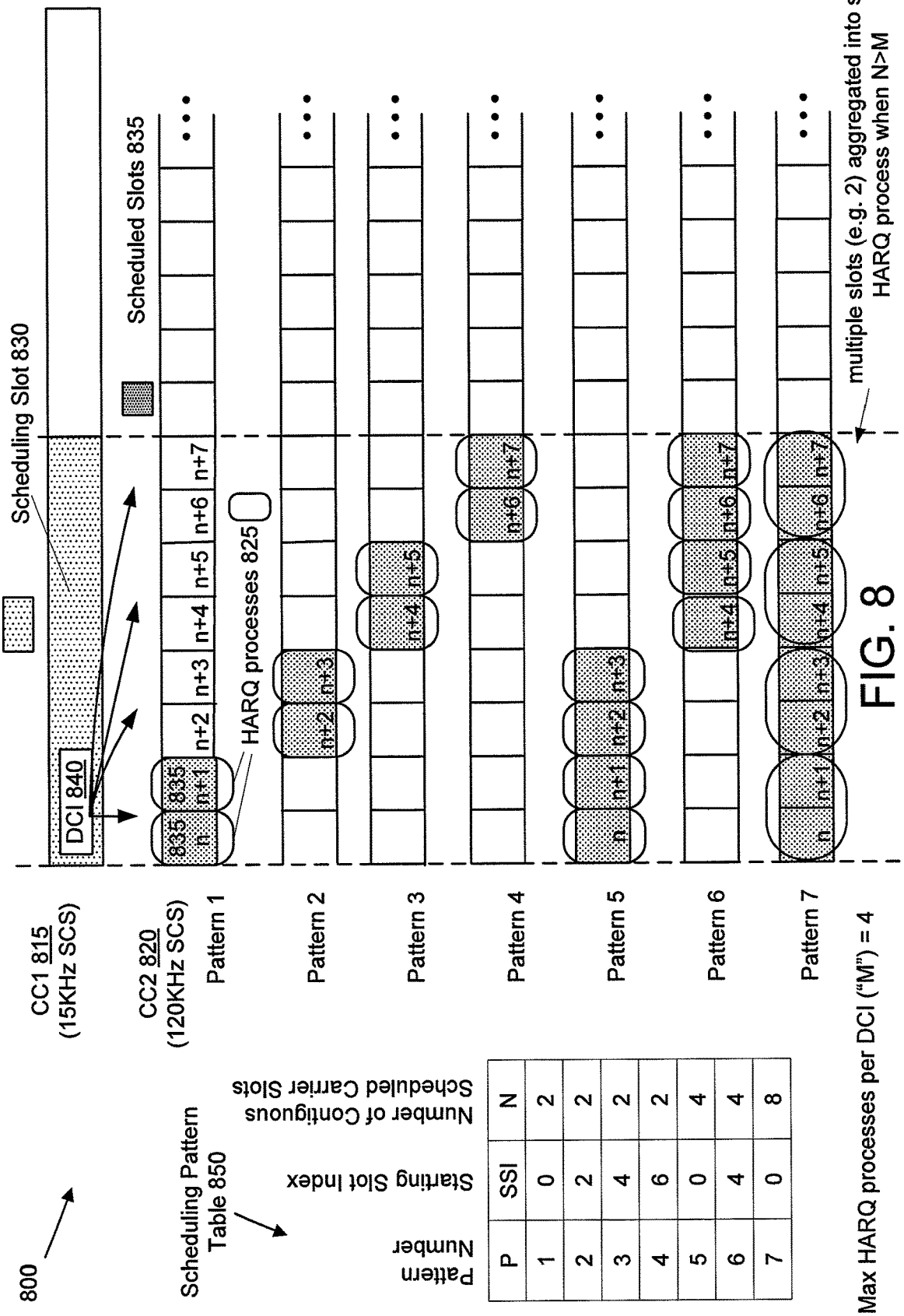
FIG. 8 is a timing diagram and a table illustrating one embodiment of efficient patterns for a scheduling slot in the first carrier to communicate the starting slot offset and number of multiple slots scheduled on the second carrier.

FIG. 8 depicts a timing diagram and a table illustrating one embodiment 800 of efficient cross-carrier and multi-slot scheduling. In FIG. 8, a base station (e.g., the gNB 210) transmits DCI on a first component carrier CC1 815 (e.g., the scheduling carrier) to communicate a starting slot index (denoted herein as "SSI") and a number of contiguously scheduled slots, N, slots on a second component carrier CC2 820. To communicate N, the gNB 210 may use RRC signaling to configure a set of possible values, e.g., {2, 4, 8, 16}. Here, N is a power of 2.

Afterwards, the DCI 840 on component carrier CC1 815 includes a field to dynamically indicate which value of the possible values for N is to be used for scheduling N multiple slots on component carrier CC2 820. Accordingly, the set of possible values is semi-statically configured at the UE 205, while each DCI selects a member of the set. Here, two bits may be included in DCI 840 to indicate the value of N from the set of values consisting of {2, 4, 8, and 16}.

In certain embodiments, the gNB 210 also semi-statically configures the scheduled starting slot on CC2 820, e.g., via RRC signaling. For example, the UE 205 may be configured with a set of possible starting slot index ("SSI") with respect to a beginning slot n on CC2 820, e.g., one value from the set of {0, 2, 4, 8} corresponding to actual starting slot index, n, n+2, n+4, n+8, respectively. In other words, a set of the possible values can be configured to determine the starting slot index SSI for multiple scheduled carrier slots 835 until such time as the SSI is updated. Embodiments that utilize a semi-statically configured SSI provide an advantage of some flexibility in changing the SSI from time to time without the overhead of including a separate SSI as part of each DCI 840. In other embodiments, the selected SSI may be dynamically indicated in the DCI 840. For example, the DCI 840 may include two bits for indicating the SSI from a preconfigured set of values, such as {0, 2, 4, 8}.

In certain embodiments, certain particularly useful combinations of a starting slot index (SSI) and a number of contiguous scheduled slots (e.g., N) may be selected using a scheduling pattern P that may be encoded in as few as three bits of the DCI 840. Scheduling pattern table 850 illustrates one embodiment of a lookup table containing seven particularly useful combinations of SSI and N. Each of the seven particularly the useful combinations are shown in the timing view of FIG. 8. Here, the DCI 840 includes three bits to indicate the pattern number "P" selected from the scheduling pattern table 850.

For example, in pattern 1 of FIG. 8, the starting slot index SSI equals zero and N equals two, so two contiguous slots on component carrier CC2 820 are scheduled at slots n, and n+1. In the example illustrated, M is set to four, so the two scheduled slots 835 correspond to two HARQ processes 825 and no HARQ process bundling is required. Patterns 2, 3, and 4 similarly schedule two contiguous scheduled slots 835 on component carrier CC2 820 except that, as indicated by the starting slot index SSI, the two scheduled slots 835 slot start at n+2 for pattern 2, at n+4 for pattern 3, and at n+6 for pattern 4. Again, because N is not greater than M, no aggregation of multiple slots within one HARQ process 825 is needed.

Pattern 5 and pattern 6 each schedule four contiguous slots on component carrier CC2 820. For pattern 5, SSI is zero resulting in the scheduling of slots n, n+1, n+2, and n+3. For pattern 6, SSI is four resulting in the scheduling of slots n+4, n+5, n+6, and n+7. For patterns 5 and 6, N is equal to M. Because N is not greater than M, HARQ process bundling is not needed and each of the scheduled slots 835 corresponds to one HARQ process 825.

Pattern 7 illustrates one embodiment of aggregating N multiple scheduled slots 835 within M HARQ processes 825 where N is greater than M. In the example illustrated, N=8 and SSI=0 so the eight contiguous scheduled slots 835 (shown as rectangles with dark fill patterns) are scheduled on component carrier CC2 820 starting at slot n. Because N is greater than M, multiple scheduled slots 835 are bundled into a single HARQ process 825.

Here, the number of slots per HARQ process is two. Note that N/M equals two. The first two scheduled slots 835 (n, n+1) are aggregated into a first HARQ process 825. The second two scheduled slots 835 (n+2, n+3) are aggregated into a second HARQ process 825. The third two scheduled slots 835 (n+4, n+5) are aggregated into a third HARQ process 825. The fourth two scheduled slots 835 (n+6, n+7) are aggregated into a fourth HARQ process 825. Thus, component carrier CC1 815 schedules eight contiguous slots on component carrier CC2 820 without exceeding M the maximum number of HARQ processes 825 per DCI 840, which in this example is set to 4.

In some embodiments, certain combinations of starting slot index, N number of scheduled slots, and M maximum number of HARQ processes per DCI provide specific advantages of minimizing the total number of overhead bits associated with each DCI 840 while at the same time taking advantage of multi-slot scheduling on a component carrier CC2 with large subcarrier spacing (e.g., 120 kHz).

FIG. 9 illustrates various embodiments of efficient slot scheduling patterns. FIG. 9 contrasts the scheduling pattern table 850, discussed above with respect to FIG. 8, with a first extended scheduling pattern table 900 and a second extended scheduling pattern table 920.

The scheduling pattern table 850 is the same table shown in FIG. 8 and illustrated in the timing diagram view of FIG. 8 and is included in FIG. 9 for comparison with scheduling pattern tables 900 and 920. The tables 900 and 920 operate substantially the same as the scheduling pattern table 850 with respect to the pattern number P, the starting slot index SSI, and N the number of scheduled slots 835. Similarly, the patterns in tables 900 and 920 may be combined with the aggregation of multiple scheduled slots 835 within a lesser number of HARQ processes 825. Thus, the tables 900 and 920 may be understood without requiring timing diagram views of the tables 900 and 920.

In some embodiments, the number of patterns P that may be increased with only one additional bit of overhead to the DCI 840. While only one additional pattern P=8 as shown in each of the tables 900, 920, other specific patterns (e.g. P=9 through P16) may be added while still only requiring a total of four bits to select any of 16 patterns P. Alternatively, certain less-frequently used patterns (e.g., certain of patterns 1-6) may be replaced in the tables 900, 920 with selected more-frequently used patterns (e.g., pattern 8) for particular systems in order to limit the total number of patterns in each table to eight patterns so that P can be communicated by DCI 840 using only three signaling bits. Note that tables 900 and 920 each allow the DCI 840 to schedule slots 835 in component carrier CC2 820 that correspond to slot "m+1" on the component carrier CC1 815.

Thus, by combining the ability to efficiently and flexibly schedule a starting slot and a number of slots in carrier aggregation with the independent ability to schedule aggregation of multiple slots within a smaller maximum number of HARQ processes, the embodiments disclosed herein provide dynamic flexibility for multi-slot scheduling in carrier aggregation across component carriers having different numerologies.

Figure 10:
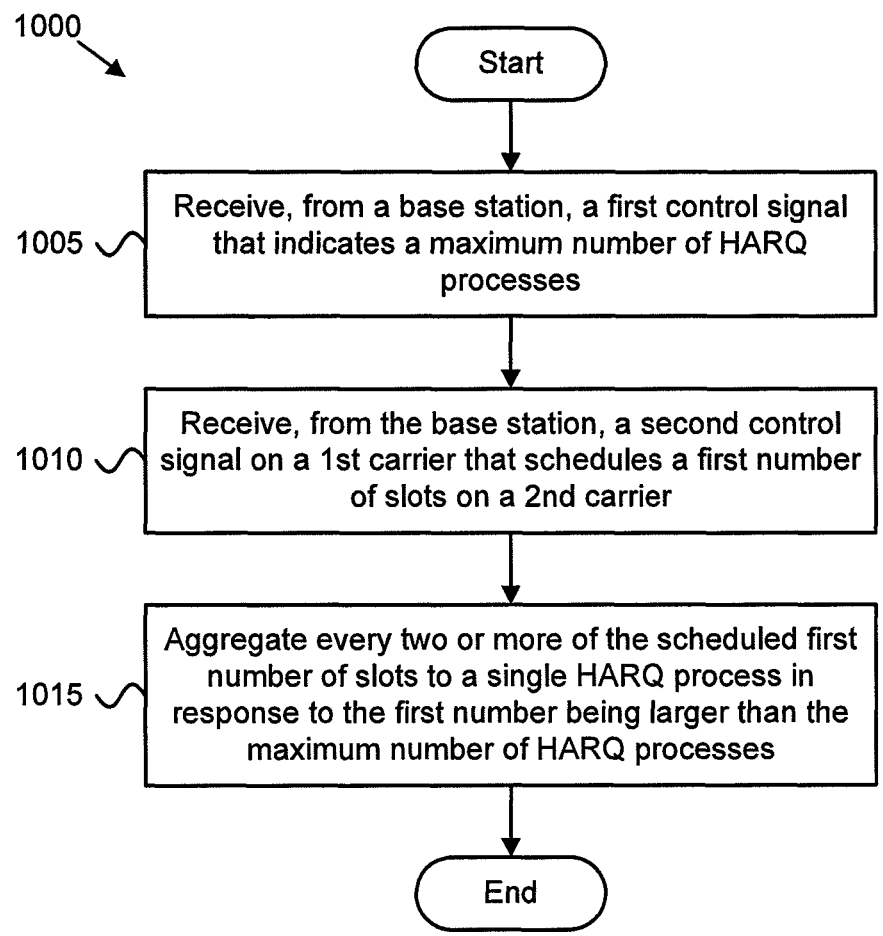
FIG. 10 is a schematic flow chart diagram illustrating from a UE perspective an embodiment of a method of cross-carrier scheduling in carrier aggregation with a first component carrier scheduling multiple slots on a second component carrier having a different numerology.

FIG. 10 is a schematic flow chart diagram illustrating one embodiment of a method 1000 for efficient cross-carrier scheduling of multiple slots, according to embodiments of the disclosure. In some embodiments, the method 1000 is performed by a remote unit, such as the remote unit 105, the UE 205, and/or the user equipment apparatus 300. In certain embodiments, the method 1000 may be performed by a processor executing program code, for example, a microcontroller, a microprocessor, a CPU, a GPU, an auxiliary processing unit, a FPGA, or the like.

The method 1000 begins and receives 1005 a first control signal from a base station, such as the gNB 210. The first control signal indicates a maximum number of hybrid automatic repeat request ("HARQ") processes. Here, the maximum number of HARQ processes maintains the DCI payload size to a manageable size. In certain embodiments, receiving 1005 the first control signal includes receiving an RRC signal from the base station. In one embodiment, the first control signal also indicates an offset between the reception of the second control signal and a starting slot of the scheduled first number of slots.

In some embodiments, the first control signal also configures the remote unit with a set of scheduling values and/or a set of scheduling patterns. For example, the first control signal may configure a set of size values which represent possible numbers of slots scheduled for the remote unit. As another example, the first control signal may configure a set of starting slot values which represent a slot offset amount with respect to a beginning slot of the slots on the second carrier the correspond to the slot on the first carrier in which the second control signal is received. In yet another example, the first control signal may configure a set of scheduling patterns as discussed above with reference to FIGS. 8 and 9. Here, each scheduling pattern indicates a starting slot and a number of scheduled slots.

The method 1000 includes receiving 1010, from a base station, a second control signal on a first carrier. Here, the second control signal schedules a first number of slots on a second carrier. In some embodiments, the subcarrier spacing value of the first carrier is smaller than that of the second carrier. In certain embodiments, the second control signal includes DCI for multi-slot scheduling. As discussed above, the second control signal may indicate a particular member of a previously configured set of scheduling values or of a previously configured set of scheduling patterns.

In some embodiments, the second control signal indicates a slot aggregation granularity. Here, the slot aggregation granularity indicates a number of the scheduled slots to be aggregated into a single HARQ process. In certain embodiments, the second control signal indicates an offset between the reception of the second control signal and a starting slot of the scheduled first number of slots.

The method 1000 includes aggregating 1015 every two or more of the scheduled first number of slots to a single HARQ process in response to the first number being larger than the maximum number of HARQ processes. In certain embodiments, aggregating 1015 every two or more of the scheduled first number of slots to a single HARQ process also occurs in response to receiving a slot aggregation granularity parameter in the second control signal.

In some embodiments, aggregating 1015 every two or more of the scheduled first number of slots to a single HARQ process includes receiving one TB on each of the two or more slots aggregated in a single HARQ process. In other embodiments, aggregating 1015 every two or more of the scheduled first number of slots to a single HARQ process includes receiving a single TB over the two or more slots aggregated in a single HARQ process. In certain embodiments, the two or more slots aggregated in a single HARQ process are merged to form a single slot with larger duration. Where the scheduled slots are for downlink data transmission, aggregating 1015 every two or more of the scheduled first number of slots to a single HARQ process includes transmitting the aggregated HARQ-ACK feedback to the base station. The method 1000 ends.

Figure 11:
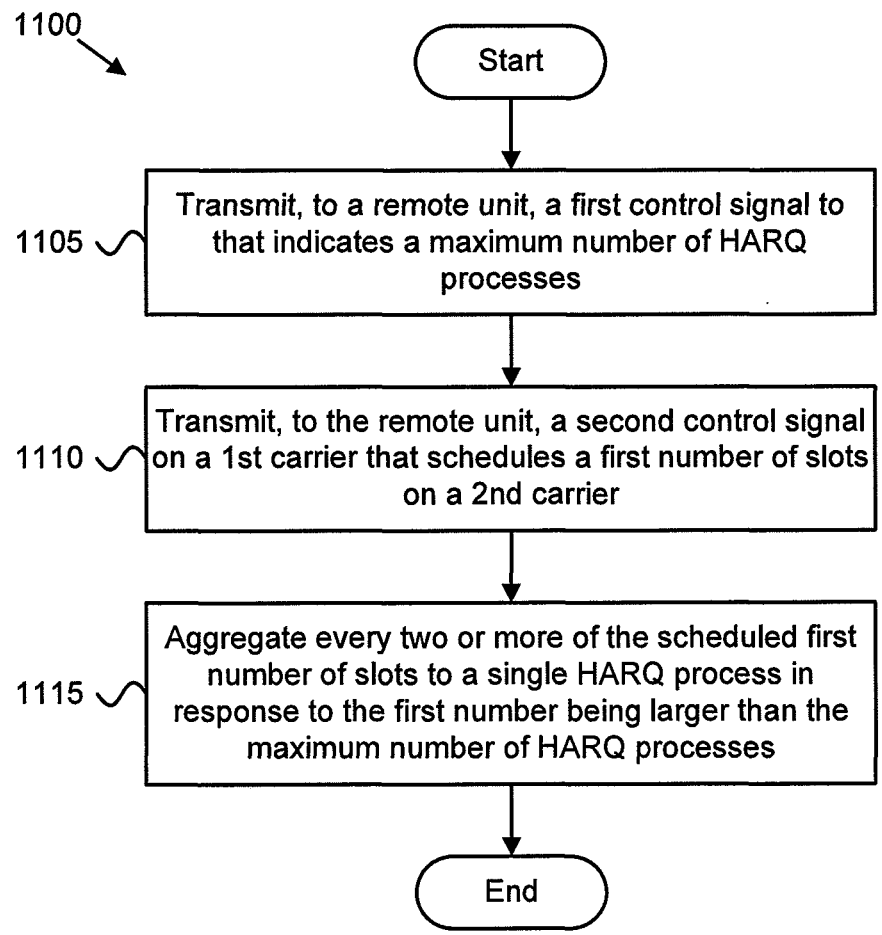
FIG. 11 is a schematic flow chart diagram illustrating from a gNB perspective an embodiment of a method of cross-carrier scheduling in carrier aggregation with a first component carrier scheduling multiple slots on a second component carrier having a different numerology.

FIG. 11 is a schematic flow chart diagram illustrating one embodiment of a method 1100 for efficient cross-carrier scheduling of multiple slots, according to embodiments of the disclosure. In some embodiments, the method 1100 is performed by a base unit, such as the base unit 110, the gNB 210, and/or the base station apparatus 400. In certain embodiments, the method 1100 may be performed by a processor executing program code, for example, a microcontroller, a microprocessor, a CPU, a GPU, an auxiliary processing unit, a FPGA, or the like.

The method 1100 begins and transmits 1105 a first control signal to a remote unit, such as the UE 205. The first control signal indicates a maximum number of hybrid automatic repeat request ("HARQ") processes. Here, the maximum number of HARQ processes maintains the DCI payload size to a manageable size. In certain embodiments, transmitting 1105 the first control signal includes transmitting an RRC signal from the base station. In one embodiment, the first control signal also indicates an offset between the reception of the second control signal and a starting slot of the scheduled first number of slots.

In some embodiments, the first control signal also configures the remote unit with a set of scheduling values and/or a set of scheduling patterns. For example, the first control signal may configure a set of size values which represent possible numbers of slots scheduled for the remote unit. As another example, the first control signal may configure a set of starting slot values which represent a slot offset amount with respect to a beginning slot of the slots on the second carrier the correspond to the slot on the first carrier in which the second control signal is transmitted. In yet another example, the first control signal may configure a set of scheduling patterns as discussed above with reference to FIGS. 8 and 9. Here, each scheduling pattern indicates a starting slot and a number of scheduled slots.

The method 1100 includes transmitting 1110, to the remote unit, a second control signal on a first carrier. Here, the second control signal schedules a first number of slots on a second carrier. In some embodiments, the subcarrier spacing value of the first carrier is smaller than that of the second carrier. In certain embodiments, the second control signal includes DCI for multi-slot scheduling. As discussed above, the second control signal may indicate a particular member of a previously configured set of scheduling values or of a previously configured set of scheduling patterns.

In some embodiments, the second control signal indicates a slot aggregation granularity. Here, the slot aggregation granularity indicates a number of the scheduled slots to be aggregated into a single HARQ process. In certain embodiments, the second control signal indicates an offset between the reception of the second control signal and a starting slot of the scheduled first number of slots.

The method 1100 includes aggregating 1115 every two or more of the scheduled first number of slots to a single HARQ process in response to the first number being larger than the maximum number of HARQ processes. In certain embodiments, aggregating 1115 every two or more of the scheduled first number of slots to a single HARQ process also occurs in response to transmitting a slot aggregation granularity parameter in the second control signal.

In some embodiments, aggregating 1115 every two or more of the scheduled first number of slots to a single HARQ process includes transmitting one TB on each of the two or more slots aggregated in a single HARQ process. In other embodiments, aggregating 1115 every two or more of the scheduled first number of slots to a single HARQ process includes transmitting a single TB over the two or more slots aggregated in a single HARQ process. In certain embodiments, the two or more slots aggregated in a single HARQ process are merged to form a single slot with larger duration. Where the scheduled slots are for downlink data transmission, aggregating 1115 every two or more of the scheduled first number of slots to a single HARQ process includes receiving the aggregated HARQ-ACK feedback from the remote unit. The method 1100 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
 a receiver that
  receives a first control signal from a base station that indicates a maximum number of hybrid automatic repeat request ("HARQ") processes, and receives a second control signal on a first carrier from the base station that schedules a first number of slots on a second carrier that is different than the first carrier; and a processor that determines whether the first number is larger than the maximum number of HARQ processes;

aggregates every two or more of the scheduled first number of slots to a single HARQ process when the first number is larger than the maximum number of HARQ processes.

2. The apparatus of claim 1, further comprising a transmitter that transmits uplink data to the base station on the scheduled first number of slots in response to the second control signal scheduling uplink data transmission.

3. The apparatus of claim 1, further comprising a transmitter that transmits HARQ acknowledgement ("HARQ-ACK") feedback to the base station corresponding to the scheduled first number of slots in response to the second control signal scheduling downlink data transmission.

4. The apparatus of claim 1, wherein the second control signal indicates a slot aggregation granularity, wherein a number of the aggregated slots in a single HARQ process is equal to the slot aggregation granularity.

5. The apparatus of claim 1, wherein the first control signal further configures a set of values of the first number and the second control signal schedules the first number of slots on the second carrier by indicating one value from the set.

6. The apparatus of claim 1, wherein the first control signal further indicates an offset between reception of the second control signal and a starting slot of the scheduled first number of slots.

7. The apparatus of claim 1, wherein the second control signal further indicates an offset between reception of the second control signal and a starting slot of the scheduled first number of slots.

8. The apparatus of claim 1, wherein the first control signal further configures a set of scheduling patterns with each scheduling pattern indicating a starting slot and a number of scheduled slots, and the second control signal schedules the first number of slots on the second carrier by indicating one scheduling pattern from the configured scheduling pattern set.

9. The apparatus of claim 1, wherein a subcarrier spacing value of the first carrier is smaller than that of the second carrier.

10. The apparatus of claim 1, wherein the receiver further receives one transport block ("TB") on each of the two or more slots aggregated in a single HARQ process.

11. The apparatus of claim 1, wherein the receiver further receives a single transport block ("TB") over the two or more slots aggregated in a single HARQ process.

12. The apparatus of claim 1, wherein the two or more slots aggregated in a single HARQ process are merged to form a single slot with larger duration.

13. A method comprising:

receiving, from a base station, a first control signal that indicates a maximum number of hybrid automatic repeat request ("HARQ") processes, receiving, from the base station, a second control signal on a first carrier that schedules a first number of slots on a second carrier that is different than the first carrier;

determining whether the first number is larger than the maximum number of HARQ processes;

aggregating every two or more of the scheduled first number of slots to a single HARQ process when the first number is larger than the maximum number of HARQ processes.

14. The method of claim 13, further comprising transmitting uplink data to the base station on the scheduled first number of slots in response to the second control signal scheduling uplink data transmission.

15. The method of claim 13, further comprising transmitting HARQ acknowledgement ("HARQ-ACK") feedback to the base station corresponding to the scheduled first number of slots in response to the second control signal scheduling downlink data transmission.

16. The method of claim 13, wherein the second control signal indicates a slot aggregation granularity, wherein a number of the aggregated slots in a single HARQ process is equal to the slot aggregation granularity.

17. The method of claim 13, wherein the first control signal further configures a set of values of the first number and the second control signal schedules the first number of slots on the second carrier by indicating one value from the set.

18. The method of claim 13, wherein the first control signal further indicates an offset between reception of the second control signal and a starting slot of the scheduled first number of slots.

19. The method of claim 13, wherein the second control signal further indicates an offset between reception of the second control signal and a starting slot of the scheduled first number of slots.

20. The method of claim 13, wherein the first control signal further configures a set of scheduling patterns with each scheduling pattern indicating a starting slot and a number of scheduled slots, wherein the second control signal schedules the first number of slots on the second carrier by indicating one scheduling pattern from the configured scheduling pattern set.

* * * * *